United States Patent [19]

Ogihara et al.

[11] Patent Number: 4,648,701

[45] Date of Patent: Mar. 10, 1987

[54] CONTROL CIRCUIT FOR PROGRAM SHUTTER

[75] Inventors: Masuo Ogihara; Hajime Oda; Yoichi Seki; Hiroshi Yamazaki, all of Yotsukaido, Japan

[73] Assignee: Seiko Koki Kabushiki Kaisha, Chiba, Japan

[21] Appl. No.: 734,039

[22] Filed: May 14, 1985

[30] Foreign Application Priority Data

May 30, 1984 [JP] Japan ................................ 59-110311

[51] Int. Cl.[4] .............................................. G03B 7/08
[52] U.S. Cl. ................................. 354/439; 354/234.1
[58] Field of Search .................... 354/439, 452, 271.1, 354/230, 233, 234.1, 435, 204

[56] References Cited

U.S. PATENT DOCUMENTS

| 4,021,826 | 5/1977 | Iwata et al. | 354/204 |
| 4,041,512 | 8/1977 | Iwata et al. | 354/234.1 |
| 4,057,810 | 11/1977 | Iwata | 354/439 |
| 4,494,846 | 1/1985 | Kurosu et al. | 354/435 |

Primary Examiner—Russell E. Adams
Attorney, Agent, or Firm—Robert E. Burns; Emmanuel J. Lobato; Bruce L. Adams

[57] ABSTRACT

In a program shutter including a forwardly/reversely rotatable step motor for opening and closing a shutter blade to effect automatic exposure, a drive pulse number and an interpolation quantity are set in first and second counters. A step drive pulse is generated by the first counter to start opening the sectors. After a final pulse is generated, the second counter is started, and at the timing when the time corresponding to the interpolation quantity is elapsed, the step motor is reversely rotated thereby to fractionate a gap between steps and obtain a proper exposure quantity.

1 Claim, 6 Drawing Figures

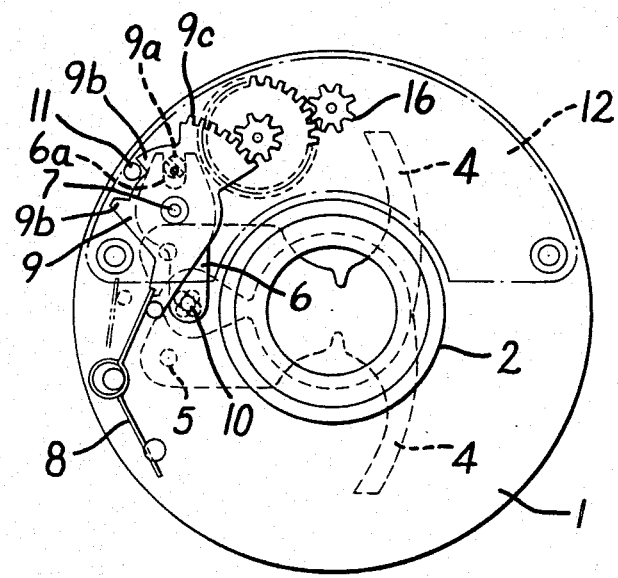
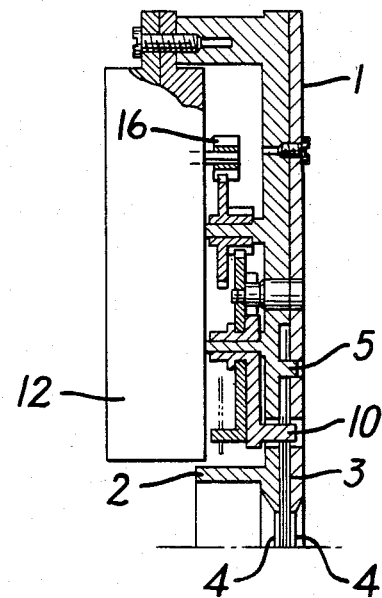
FIG. 1a  FIG. 1b
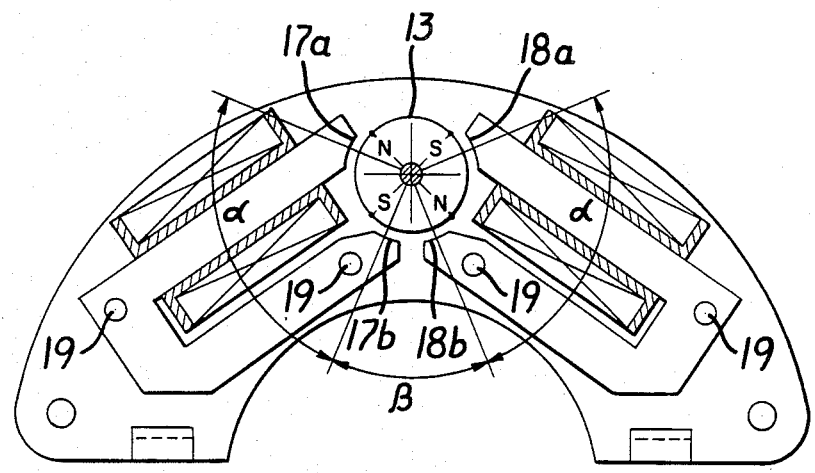
FIG. 2a
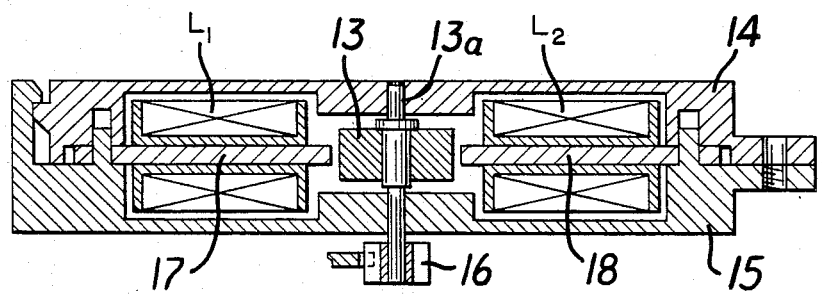
FIG. 2b

CONTROL CIRCUIT FOR PROGRAM SHUTTER

BACKGROUND OF THE INVENTION

1. Technical Field

This invention relates to a control circuit suitable for a program shutter permitting a shutter blade to be opened and closed by a step motor.

2. Prior Art

The program shutter permitting a shutter blade to be opened and closed by the step motor is constituted in such that a drive pulse having a fixed frequency is inputted to the step motor by a release operation to forwardly rotate the step motor and gradually open sectors, and a phase of the drive pulse is switched at a timing when the step motor is rotated by such steps as corresponding to an exposure quantity to reversely rotate the step motor and close the sectors, thus obtaining a predetermined exposure.

However, as the step motor to be used for the shutter has a low maximum rotating speed of at most 500-1000 pulse/sec, a shortest time required for rotation of one step is limited, and in particular, there occurs large error in short time exposure. On the other hand, there occurs slippage between a drive signal and an exposure quantity due to ununiformity of a sector shape and play of a rotation transmitting mechanism, etc. As a result, it has been impossible to obtain an expected exposure.

Object

The present invention is characterized in that a rotating step number of a step motor and an interpolation quantity are determined according to an exposure quantity, and that sectors are stepwise driven by a step drive pulse according to the step number upon opening of a shutter, and that the step motor is reversely rotated at a timing when a time corresponding to the interpolation quantity is elapsed from a timing when a final step drive pulse is inputted, and that a gap between steps is fractionated to obtain a proper exposure quantity.

Constitution

BRIEF DESCRIPTION OF THE DRAWINGS

FIGS. 1a and 1b are elevational and sectional views of the preferred embodiment of the shutter mechanism to be employed in the present invention, respectively;

FIGS. 2a and 2b are elevational and sectional views of the preferred embodiment of the step motor to be employed in the present invention, respectively;

DETAILED DESCRIPTION OF THE INVENTION

Figure 3:
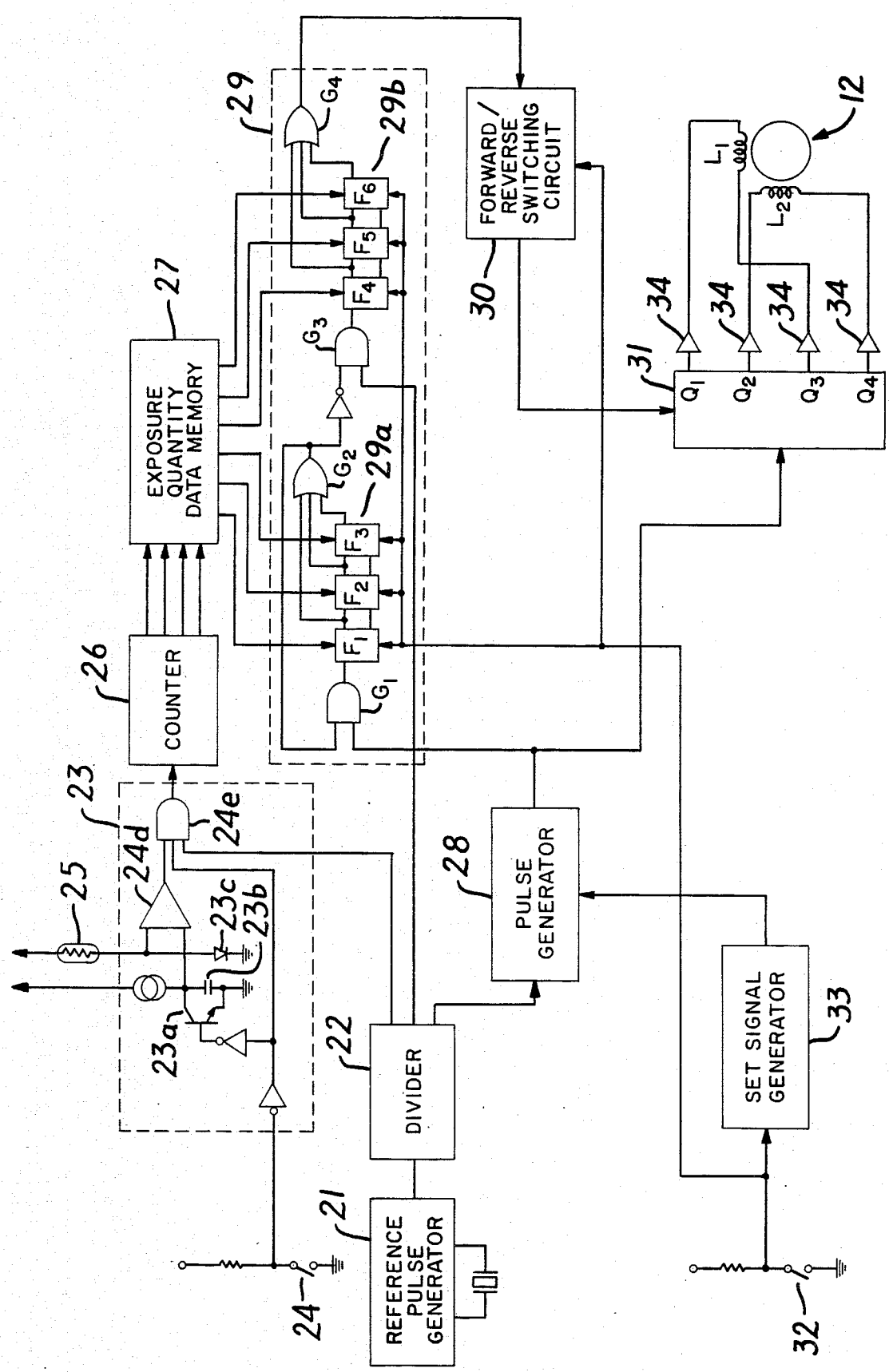
FIG. 3 is a block diagram of the preferred embodiment of the shutter control device according to the present invention.

A preferred embodiment of the present invention will be described below in detail with reference to the drawings.

FIG. 1 shows an exemplary shutter mechanism adapted to the present invention, in which a reference numeral 1 designates a base plate mounting a guide plate 2 thereon for positioning a lens. There is defined a sector chamber 3 between the base plate 1 and the guide plate 2. Two sectors 4 symmetrically rotating to determine a lens aperture are rotatably mounted by a pin 5 in the sector chamber 3. A sector drive lever 6 is rotatably supported by a shaft 7 fitted to the base plate 1, and is engaged through a recessed portion 6a formed at its one end with a pin 9a of a sector driving wheel 9 (which will be hereinafter described) rotatably mounted to the shaft 7, while it is also engaged with sectors 4 by a sector pin 10 fitted to the base plate side. The sector driving wheel 9 as above mentioned is rotatably supported by the shaft 7 so as to be restricted in a reference position at rest by stopper portions 9b formed on an outer circumference of the wheel and a spring 8 applying levo-rotation, and is connected by a teeth portion 9c formed at one end thereof through a circle train to a drive shaft 13a of a step motor 12 (which will be hereinafter described). Reference numeral 11 designates a pin for engaging with the stopper portions 9a of the sector driving wheel 9 to restrict a rotational range.

FIG. 2 shows a preferred embodiment of the step motor 12 as above mentioned, in which reference numeral 13 designates a quadripole rotor constituted of a permanent magnet. The quadripole rotor 13 is constituted in such that one end of a rotor shaft 13a is projected so as to be rotatably mounted to an upper plate 14 and a lower plate 15, and the sector driving wheel 9 of the shutter mechanism is driven by a pinion 16 mounted to the shaft 13a. Reference numerals 17 and 18 are stators formed of U-shaped magnetic materials having respective two leg portions. Each one of the respective leg portions is surrounded by exciting coils $L_1$ and $L_2$, and there are formed magnetic pole portions 17a, 17b, 18a and 18b at respective free ends of each stator in a position at an angle of 90° to the rotor 13. The stators 17 and 18 are arranged in an inversed V-shape and are positioned by guide pins 19 so that the magnetic pole portions 17b and 18b may be positioned at an angle of 45° to the rotor 13. The rotor 13 is permitted to be rotated in forward and reverse directions with one step set at 90°.

FIG. 3 shows a preferred embodiment of the control device forming a characterized portion of the present invention, in which reference numeral 22 designates a divider circuit for stepping down an output signal from a reference pulse generator 21 provided with a crystal resonator to a predetermined rate, and generating a clock CK1 for digitizing photometric data, a clock CK2 for stepwise driving the sectors and a clock CK3 for interpolation. A luminance detection circuit 23 is constituted in such that a terminal voltage of a capacitor 23b to be charged by a constant current through a transistor 23a which is turned on and off by a switch 24 interlocked with a release button (not shown) is compared with a terminal voltage of a logarithmic compression diode 23c connected with a light receiving element such as CdS in series by a comparator 24d, and that a gate 24e is opened upon operation of the switch 24 to output the clock CK1 to a counter circuit 26 as will be hereinafter described, while the gate 24e is closed upon inversion of the comparator 24d to stop outputting the clock CK1, thus outputting a digitized object luminance. The counter circuit 26 is cleared by the operation of the switch 24, and simultaneously acts to count the clock CK1 outputted from the luminance detection circuit 23 and output a content thereof. An exposure quantity data memory circuit 27 storing a step motor drive data according to an object luminance is permitted to access a data of step number for rotating the step motor and an interpolation data for compensating an exposure error generated by the step number and slippage between the drive signal and the exposure quantity due to ununiformity of a sector shape and play of the rotation transmitting mechanism according to a count content of the counter circuit 26. A step drive pulse generator 28 is adapted to generate a constant frequency pulse P, for forwardly driving the step motor by operating a release switch 32 which will be hereinafter described according to the clock CK2 for stepwise driving the sectors. A rotation mode switching counter 29 comprises a first presettable down counter 29a including flip-flops $F_1$ to $F_3$ cascade-connected with each other and a second presettable down counter 29a including flip-flops $F_4$ to $F_6$ cascade-connected with each other. The first counter 29a acts to preset a step number from the exposure quantity data memory circuit 27 at starting of forward rotation and inversion of the pulse motor, and output a signal from an output gate $G_2$ when a counter content is subtracted by a pulse P one by one and finally reaches zero. The second counter 29b acts to preset an interpolation quantity data from the exposure quantity data memory circuit 27 at starting of forward rotation of the pulse motor, and output a signal from an output gate $G_4$ when a counter content is subtracted by the interpolation clock CK3 one by one from a timing when the content of the first counter 29a has reached zero, and finally the counter content reaches zero. A forward/reverse switching circuit 30 serves to latch the signal from the mode switching counter circuit 29 and switch a pulse movement direction of a step motor driver 31 which will be next described. The step moror driver 31 is constituted of a so-called ring counter which permits a signal output terminal to move to an adjacent terminal one by one every time a pulse signal is inputted. In other words, the step motor driver 31 acts to receive a pulse signal from the forward/reverse switching circuit 30, and switch a pulse movement direction according to the pulse signal from the forward-/reverse switching circuit 30 to drive the step motor in a forward or reverse direction.

A second switch 32 serves to reset the rotation mode switching counter 29 and the forward/reverse switching circuit 30 by operating the release button. A set signal generating circuit 33 serves to set the pulse generator 28 by the operation of the switch 32. Drive circuits 34 serve to amplify signals from output terminals $Q_1$ to $Q_4$ of the step motor driver 31 and supply current to exciting coils $L_1$ and $L_2$ of the step motor.

Figure 4:
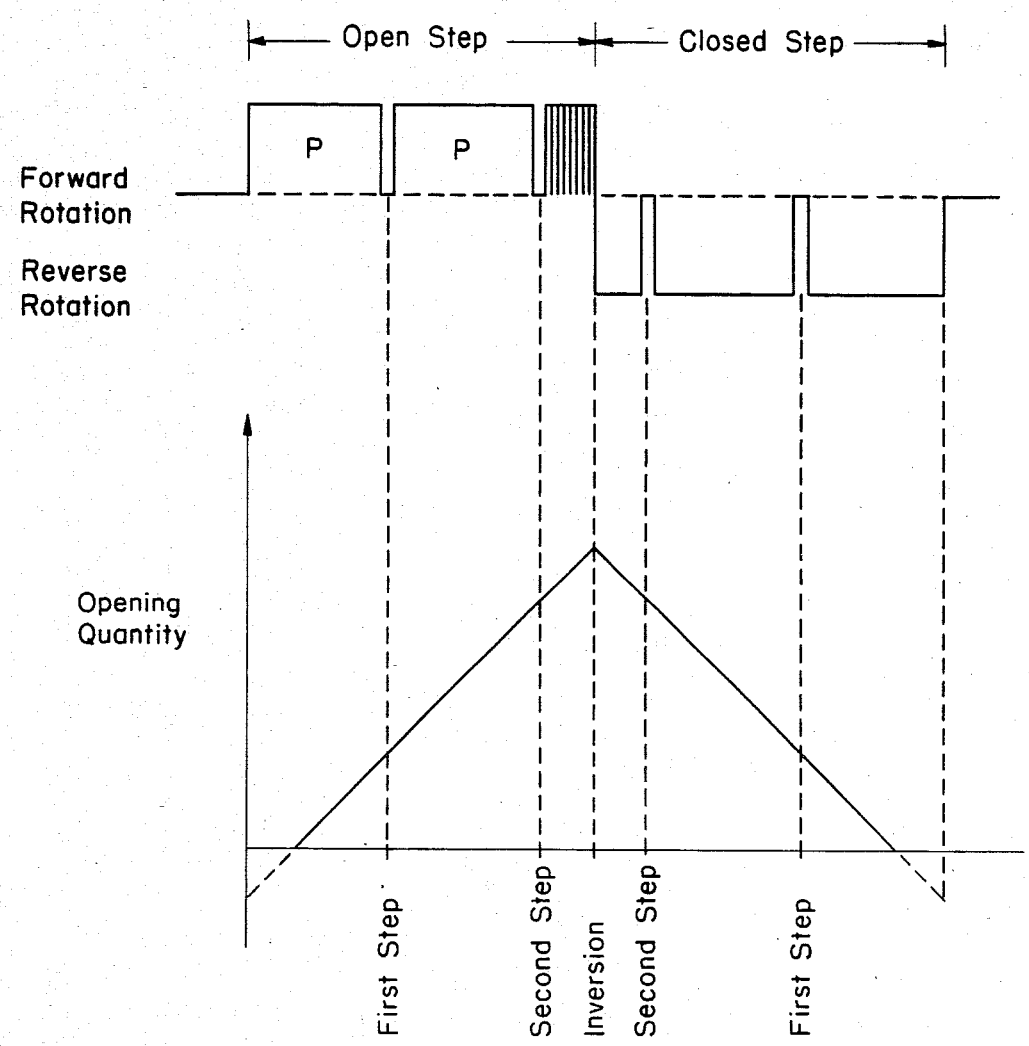
FIG. 4 is a timing chart showing operation of the control device in FIG. 3.

Operation of the above-mentioned device will be described below with reference to a timing chart as shown in FIG. 4.

After turning on a power switch (not shown), when a release button of a camera body is pushed to a first position, the first switch is turned on, and the object luminance detection circuit 23 is operated to output the clock CK1 of the number corresponding to object luminance and store a luminance data in the counter 26. The exposure quantity data memory circuit 27 outputs a step number capable of covering an exposure quantity and an interpolation quantity for compensating such a step rotation to the first down counter 29a and the second down counter 29b of the rotation mode switching counter circuit 29, respectively, according to the luminance data of the counter 26, and presets the step number and the interpolation quantity, then setting an exposure data corresponding to the object luminance.

Upon completion of setting of the exposuure data, when the release button is pushed to the second position, the switch 32 is turned on to reset the rotation mode switching counter 29 and the forward/reverse switching circuit 30, and simultaneously the step drive pulse generator 28 is operated to generate a periodic pulse P which is in turn outputted to the first counter 29a of the rotation mode switching counter 29 and the step motor driver 31. The step motor 12 is forwardly rotated one step after another every time one pulse P is inputted, and accordingly the sectors 4 start to be opened, and simultaneously the first down counter 29a is counted down one step number after another. In this manner, when the pulse P of such an order as to be preset by the first down counter 29a is inputted to the step motor, the interpolation clock CK3 is inputted from the gate $G_3$ to the second counter 29b under the condition where the step motor is being rotated toward a final step. At the timing when the clock CK3 in accordance with a preset number of the second counter 29b is inputted, that is, when slippage between the drive signal and the exposure quantity due to ununiformity in sector shape and play of a rotation transmitting mechanism is compensated, the forward/reverse switching circuit 30 is inverted to output the pulse P from the pulse generator 28 and simultaneously switch the step motor driver 31 to a reverse drive side. As a result, the step motor is forcibly driven and rotated synchronously with the pulse P in the reverse direction to close the sectors 4. When the content in the first counter 29a reaches zero again, the sectors 4 are returned to their original positions to effect precise exposure wherein errors due to ununiformity in sector shape and play of a rotation transmitting mechanism have been compensated. Then, the release button is returned to its original position, and the power switch is turned off to make ready for the next photographying.

Effect

As is mentioned above, according to the present invention, the rotational step number of the step motor and the interpolation quantity are preliminarily stored according to the exposure quantity, and the sectors are stepwise driven by the step drive pulse according to the step number upon closing the shutter. When the time corresponding to the interpolation quantity is elapsed from the timing when the final step drive pulse is outputted, the step motor is reversely rotated. Accordingly, the exposure quantity may be finely controlled according to the object luminance, and additionally the exposure error due to pecuriality of the shutter mechanism body and instrumental error may be precisely corrected by such a simple electric operation that data is compensated.

What is claimed is:

1. In a program shutter including sectors forming a lens aperture and a forwardly/reversely rotatable step motor for opening and closing said sectors, a control circuit for said program shutter comprising a control unit comprising a motor control data storing means for receiving a step drive number and an interpolation quantity corresponding to an exposure quantity as a data and storing the exposure quantity in an address, a pulse generator means for generating a step drive pulse and a clock pulse, a first counter means for presetting the step drive number before opening of said sectors and before inversion of said step motor and adapted to be counted down by the step drive pulse from said pulse generator means, a second counter means for presetting the interpolation data before count-up of said first counter means and adapted to be counted down by the clock pulse, an inversion drive means for detecting a timing when said second counter means is counted up and reversely rotating said motor, and a motor drive means for driving said motor by the pulse from said pulse generator means.

* * * * *